United States Patent [19]

Schwarz

[11] 4,056,639

[45] Nov. 1, 1977

[54] PRESERVING RED COLOR IN FRESH RED MEATS

[75] Inventor: Eckhard C. A. Schwarz, Neenah, Wis.

[73] Assignee: Presto Products Incorporated, Appleton, Wis.

[21] Appl. No.: 703,723

[22] Filed: July 9, 1976

[51] Int. Cl.² .................. A23B 4/14; A23L 1/272
[52] U.S. Cl. .................. 426/264; 428/311; 264/41; 264/210 R; 264/DIG. 8; 264/DIG. 47; 260/2.5 HA; 426/133; 426/310; 426/332; 426/266; 426/265
[58] Field of Search ........... 426/133, 264, 266, 265, 426/268, 323, 332, 641, 302, 310, 69, 105; 264/176, 171, DIG. 47, DIG. 8, 41, 211, 210 R; 106/286; 427/400; 252/308, 397, 407, 401, 403; 428/311; 260/2.5 HA

[56] References Cited

U.S. PATENT DOCUMENTS

| | | | |
|---|---|---|---|
| 2,684,282 | 7/1954 | Wormell | 264/202 |
| 3,839,516 | 10/1974 | Williams | 264/DIG. 47 |
| 3,920,785 | 11/1975 | Orvin | 264/DIG. 47 |
| 3,950,473 | 4/1976 | Iwahori | 264/DIG. 47 |

FOREIGN PATENT DOCUMENTS

| | | | |
|---|---|---|---|
| 673,724 | 11/1963 | Canada | 426/264 |
| 592,190 | 2/1960 | Canada | 426/133 |
| 822,758 | 10/1959 | United Kingdom | 426/133 |

*Primary Examiner*—Hiram H. Bernstein
*Attorney, Agent, or Firm*—Joseph P. House, Jr.

[57] ABSTRACT

The red color of fresh red meats is preserved by adding thereto a color preservative selected from the group consisting of sodium cyanate, acetylurea, sodium-5-acetylhydantoate, urethylane sodium carboxylate and mixtures thereof. In a preferred embodiment, these color preservatives are incorporated in a resinous polymeric film which is fibrillated to provide an open-celled, microporous structure having a large internal surface area. Such films can be used as an interleaf between layers of slices of freshly cut red meat and are effective for preserving the fresh color for several hours.

17 Claims, 2 Drawing Figures

PRESERVING RED COLOR IN FRESH RED MEATS

BACKGROUND OF THE INVENTION

This invention relates to a process for preserving the natural red color of freshly butchered meat and to an interleaf for placement between layers or slices of freshly butchered meat to preserve the natural red color thereof.

The modern consumer associates a bright red color of meats, such as beef, pork, lamb and veal, with freshness. It is well known that these meats rapidly lose their bright red color after butchering and turn a brownish color under certain conditions.

This brown coloration is due primarily to chemical changes of the pigment myoglobin present in the meat. In its reduced form, myoglobin imparts a purple-red color to the meat. Oxymyoglobin, which is bright red, and metmyoglobin, which is a grayish-brown color, are both obtainable from reduced myoglobin. Upon being exposed to air after the meat is cut or ground, myoglobin takes up oxygen from the air and is converted by an oxygenation process to oxymyoglobin. On the other hand, exclusion of air from the surface of the fresh cut or ground meat hastens the production of metmyoglobin with a resultant discoloration which is undesirable from the consumer's point of view. The chemistry responsible for these color changes with respect to the availability of oxygen has been well investigated by various researchers and is summarized in an article entitled, "The Chemistry of Meat Pigments", *Journal of Agricultural Food Chemistry*, Vol. 14, pp. 207-10 (May-June, 1966).

When slices of freshly cut meat, such as beef steaks, are stacked on top of each other during butchering, air necessarily is excluded from the adjoining surfaces and these surfaces turn a brownish color within a few hours. To alleviate this problem, it has been common practice to place sheets of porous paper between the individual slices of meat. The trace amounts of air trapped in the fibrous structure of such a paper interleaf apparently is sufficient to delay the formation of the undesired metmyoglobin and other discoloring pigments. The desired red color can be prolonged further by impregnating the paper with certain additives which inhibit the formation of metmyoglobin and other discoloring pigments.

Such a paper interleaf tends to absorb moisture from the meat and is highly susceptible to tearing and/or sticking on the meat while being removed prior to packaging of the meat. The added time required to remove all of the fragments of the paper interleaf from the meat reduces the efficiency of the packaging process. Sheets of synthetic plastic films, such as polyethylene and polypropylene, should be better suited for this purpose because these materials are not weakened by wetting and otherwise have a higher strength. However, it has been found that, when conventional plastic films are used as a meat interleaf, they do not inhibit discoloration of the meat. Instead, the meat turns a brownish color in about the same time as if no interleaf were used.

One approach commonly employed for preserving the red color of fresh meat is to provide an oxygen permeable film for packaging the meat which permits sufficient oxygen from the atmosphere to diffuse therethrough and contact the meat to maintain myoglobin in an oxygenated state. Representative of such packaging material is disclosed in U.S. Pat. Nos. 2,676,943 (Carson), 2,835,595 (Salatiello), 2,900,260 (Snyder et al), 2,931,732 (Hoffman et al), 3,003,884 (Andrews) and 3,423,212 (Purcell et al). These packaging films generally are not suitable for use in an interleaf. The stacked meat effectively excludes the entry of atmospheric air which is necessary for replenishing the oxygen required to maintain the myoglobin in an oxygenated state. While such films are oxygen permeable, they typically do not have the degree of porosity required to trap a sufficient amount of available oxygen to prevent the undesired discoloration of the meat within a relatively short period of time.

Another approach commonly employed for preserving the red color of fresh meat is to treat the meat with various chemicals which, through a chemical mechanism not fully understood, inhibit the formation of metmyoglobin and other discoloring pigments. These chemicals typically are applied to the meat prior to packaging. For example, U.S. Pat. No. 2,863,777 (Dekker) discloses that the red color of fresh meat can be preserved for at least 12 hours by sprinkling, spraying, or injecting the meat with a mixture of beta-substituted pyridine and ascorbic acid prior to packaging. U.S. Pat. Nos. 2,491,646 (Coleman) and 3,600,200 (Bernholdt et al) disclose a similar treatment with nicotinic acid. U.S. Pat. Nos. 3,266,909 (Ellis), 3,615,691 (Duiven et al), 3,821,437 (Heller et al) and 3,867,558 (Sato et al) respectively disclose the use of glutamic acid salts, tetrazoles, beta-carotene and hydroxypyrones for this purpose.

Such conventional color preservatives cannot be incorporated into a thermoplastic polymeric film because they tend to decompose at temperatures below those normally used for forming such films.

SUMMARY OF THE INVENTION

One of the objects of the invention is to provide a porous film which can be used as an interleaf sheet for fresh red meats and is capable of maintaining the bright red color thereof for several hours.

Another object of the invention is to provide such a porous film made from a thermoplastic polymeric composition and having a meat color preservative incorporated therein.

A further object of the invention is to provide meat color preserving compounds which either can be added directly to the meat or incorporated into an extruded thermoplastic polymeric film and still remain effective for preserving the fresh red color of meat when the film is used as a meat interleaf.

Other objects, features and advantages of the invention will become apparent upon reviewing the following detailed description and the appended claims.

Broadly, the invention resides in the discovery that compounds selected from the group consisting of sodium cyanate, acetylurea, sodium-5-acetylhydantoate, urethylane sodium carboxylate and mixtures thereof are effective for preserving the red color of fresh red meats. These compounds have protein-like structures and decompose during digestion into smaller compounds which are found in the normal human metabolic cycle and, therefore, are safe for human consumption.

In accordance with one embodiment of the invention, these compounds are applied directly to the meat.

In accordance with another embodiment of the invention, these color preservatives are incorporated into a film or sheet material, preferably formed from a thermoplastic polymeric composition, having an open-celled, microporous structure and a large internal surface area of at least 0.5 m²/g. Sheets of this material employed as an interleaf between layers or slices of fresh red meat are capable of preserving the red color of the meat for time periods up to 24 hours or longer. In order to be most effective for this application, the thermoplastic polymeric composition preferably is formed into a relatively thin film by a conventional extrusion technique and the extruded film is fibrillated in a suitable manner to form an open-celled, miroporous structure wherein from about 5 to about 70% of the total volume is pores or voids.

It is also within the scope of the invention to incorporate the above compounds into a conventional paper meat interleaf, such as by impregnating the paper with a solution thereof.

DESCRIPTION OF THE PREFERRED EMBODIMENTS

Figure 2:
FIG. 2 is a photomicrograph similar to FIG. 1, except the magnification is 1,000 times.

The present invention is applicable to all meats of the type generally classified as red meats, including beef, pork, lamb, veal and meats of other animals having red color.

Two of the color preservatives of the invention, sodium cyanate and acetylurea, are commercially available. The other two can be conveniently prepared from inexpensive intermediates.

For example, sodium-5-acetylhydantoate can be prepared by dispersing the sodium salt of hydantoic acid in acetic anhydride and heating this mixture to an elevated temperature, e.g., 80° C, to dissolve the salt and initiate the reaction. Acetic acid and excess acetic anhydride is removed from the reaction mixture, such as by evaporation, and the residue can be recrystallized in a suitable solvent, such as methanol, to obtain the desired product.

Urethylane sodium carboxylate can be prepared by adding glycolic acid to sodium cyanate to form a paste which is heated to an elevated temperature, e.g., 80° C. Excess water and glycolic is removed from the reaction mixture, such as by evaporation, and the residue can be recrystallized from a suitable solvent, such as methanol, to obtain the desired product.

These color preservatives can be applied directly to freshly cut red meat. When used in this manner, one or more of the color preservatives preferably is dissolved in water or another suitable solvent safe from human consumption and this solution is sprayed on the surface of the meat or the meat is dipped into the solution. Also, any one of the color preservatives or a mixture of two or more can be sprinkled or applied in the form of a dry powder on the meat. When a minced or ground meat is prepared, the color preservatives can be applied to the meat either before or after grinding. Further, a solution of one or more of the color preservatives can be injected into the meat with a conventional injection device.

When applied directly to the meat, the amount of color preservative used is about 0.02 to about 0.5, preferably about 0.05 to about 0.2, g per 1 square foot surface of the meat.

The color preservatives of the invention can be most advantageously used in conjunction with film-forming, resinous polymer compositions because of their ability to withstand the elevated temperatures normally used for compounding and extruding such compositions into a sheet or film without losing their effectiveness as a color preservative. In this preferred application, one or more of the color preservatives is incorporated into the extruded film by compounding with the film-forming ingredients so that the color preservative becomes an integral part of the extruded film.

In order for the thus-incorporated color preservatives to be most effective when the film is used as a meat interleaf, the film must have an open-celled, microporous structure having an internal surface area of at least 0.5 m²/g, preferably within the range of about 2 to about 10 m²/g. When ordinary extruded polymeric films including the color preservative is used as a meat interleaf, the meat becomes discolored within less than 8 hours. While not completely understood at this time, it is believed the open-celled, microporous structure performs two functions with respect to preserving the red color of the meat. First, it appears that the moisture in the meat leaches the color preservatives from the film by an aqueous extraction process. With a large internal surface area, a large quantity of the incorporated color preservative is exposed to the meat for this leaching action. Second, the open-celled, microporous structure provides numerous open pores or voids in which air can be trapped. This trapped air provides sufficient oxygen, in combination with the preservative effect of the color preservative, to inhibit the conversion of myoglobin to metmyoglobin and the formation of other discoloring pigments in the meat for time periods of up to 24 hours or more when the meat is stored under mild refrigeration conditions.

Various conventional techniques can be used to provide a film having the desired open-celled, microporous structure. Conventional fibrillation processes are particularly advantageous for this purpose and presently are preferred. Such processes typically involve using a blend of thermoplastic resinous polymers known to produce fibrillatable film and stretching or drawing the film formed therefrom, with or without the addition of a solvent swelling agent, at relatively low temperatures. Exemplary fibrillation processes capable of forming a film having the desired open-celled, microporous structure are disclosed in U.S. Pat. Nos. 3,511,742 (Rasmussen), 3,795,720 (Schwarz) and 3,839,516 (Williams et al), which patents are incorporated herein by reference. When such fibrillation techniques are used the total volume of the resultant structure should consist of from about 5 to about 70%, preferably about 20 to about 40%, open cells or voids.

Other conventional processes for forming an open-celled, microporous structure can be used, such as those used for making some types of plastic secondary battery separators and beverage filter materials wherein a soluble phase of a second material is incorporated into the film during formation and is subsequently extracted by a suitable solvent. Of course, the second material used must be soluble in the solvent in which the color preservative is substantially insoluble.

Various conventional fibrillatable, film-forming blends of resinous polymers, such as those disclosed above-identified patents incorporated herein by reference, can be used to form the film. Particularly suitable blends include about 50 to 90 parts by weight of polypropylene, polyethylene or mixtures thereof, about 5 to 50 parts by weight of polystyrene and about 1 to 20 parts by weight of an inorganic filler, such as siliceous clay (e.g., kaolin clay), titanium dioxide, calcium carbonate, magnesium silicate (talc), zinc oxide, diatomaceous earth, and mixtures thereof.

The amount of color preservative incorporated into the film will vary depending on the form and type of the meat. Amounts less than 0.25 weight %, based on the weight of the polymeric composition, generally do not improve the color preservative characteristics of the film when used as a meat interleaf. While amounts greater than 10 weight % can be used, such larger amounts do not significantly improve color preservation and, thus, represent an unnecessary added cost. Accordingly, the presently preferred amount of color preservative used is about 0.25 to about 10 weight %, most preferably about 0.5 to about 3 weight %.

While the thickness of the film can vary over a relatively broad range provided it has the above-prescribed minimum internal surface area, the thickness generally should be about 0.0005 to about 0.005 inch, preferably about 0.001 to about 0.003 inch. As a guide, when a film having a thickness of about 0.001 inch is used as an interleaf between beef steaks about 4 × 6 inches in size, a total amount of color preservative of 8 mg in the film generally is effective for preservation of the fresh red color for 24 hours or more.

While a conventional paper meat interleaf has certain disadvantages as discussed above, it is satisfactory for some uses and the color preservatives of the invention can be added thereto to improve its color preservation characteristics. When used for this purpose, the color preservatives can be added to the paper by impregnating with a solution thereof or incorporated into the paper during processing, preferably an amount within the range of about 0.25 to about 10 weight %, based on the weight of the paper.

Without further elaboration it is believed that those skilled in the art can, by using the preceding description, utilize the present invention to the fullest extent. The following examples are presented to illustrate the preferred embodiments of the invention and are not to be construed as undue limitations thereof.

EXAMPLE 1

Preparation of Sodium-5-acetylhydantoate

5 g of the sodium salt of hydantoic acid was dried in a vacuum and then dispersed in 15 ml of acetic anhydride. This mixture was heated to 80° C, causing the dispersed salt to dissolve and the commencement of an exothermic reaction. Upon completion of the reaction, acetic acid and excess acetic anhydride was removed by evaporating in a vacuum at 50° C. The residue was recrystallized from methanol to obtain the desired crystalline product which had a melting point of 276° C.

Preparation of Urethylane sodium carboxylate

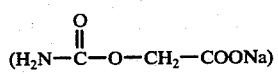

20 ml. of a 30% aqueous solution of glycolic acid (0.079 mole) was added to 4.8 g (0.074 mole) of dry, powdered sodium cyanate and the mixture was stirred to form a uniform paste. The paste was heated to 80° C and became clear. Excess water and glycolic acid was removed from the reaction mixture by evaporating in a vacuum. The residue was recrystallized from methanol to obtain the desired crystalline product which had a melting point of 164° C. Infrared analysis of the product indicated that the cyanate (peak at 2140 cm$^{-1}$) had been completely converted to urethane derivative.

EXAMPLE 2

Tests were performed to determine the color preserving properties of various chemicals, including the four color preservatives of the invention, when absorbed on a paper meat interleaf. Each chemical was first dissolved in water to obtain a 1% aqueous solution thereof and the respective solutions were each slowly dripped, by means of a pipette, onto the surface of separate 8½ × 11 inch sheets of absorbent kraft paper having a density of 42 lb/3000 ft$^2$. The amount of solution added was metered so that each sheet was loaded with 1 weight % of the respective chemical. The thus-treated sheets were dried and placed between 4 to 10 inch wide slices of freshly cut beef steaks having a fresh red color. The meat samples were stored in a refrigerator at 35° F for 24 hours, after which they were inspected for color change. The meat samples still exhibiting a red color were stored in the refrigerator at 35° F for an additional 24 hours and again inspected for color change. The results of these tests are summarized in Table I below.

TABLE I
EFFECT OF VARIOUS CHEMICAL ADDITIVES IMPREGNATED IN A PAPER INTERLEAF ON COLOR OF BEEF STEAKS

| Chemical Additive | | Meat Color | |
| --- | --- | --- | --- |
| Indent. No. | Name | After 24 hours | After 48 hours |
| 1 | Urea | bright red | bright red |
| 2 | Butylated hydroxy toluene | dark red | brown |
| 3 | Butylated hydroxy anisole | brown | — |
| 4 | Hydantoic acid | bright red | bright red |
| 5 | Sodium cyanate | bright red | bright red |
| 6 | Sodium-5-acetyl-hydantoate[1] | bright red | bright red |
| 7 | Urethylane sodium carboxylate[1] | bright red | red |
| 8 | Acetylurea | bright red | red |

Notes:
[1] Prepared by procedure described in Example 1.

EXAMPLE 3

The chemicals found to be effective color preservatives in the test described in Example 2 (Nos. 1, 4, 5, 6, 7 and 8 in Table I) were compounded, at concentrations of 1, 5 and 10 weight %, with a polypropylene resin (Profax 6423 marketed by Hercules, Inc.) in a Banbury mixer at 400° F and extruded into films having a thickness of approximately 0.002 inch. These films were used as a meat interleaf in the same manner as the paper sheets in Example 2. None of the meat samples retained their red color after 24 hours.

This series of tests was repeated using a high density polyethylene instead of polypropylene and a compounding temperature of 350° F. None of the meat samples retained their red color after 24 hours.

The heat stability of each chemical additive was noted in both test series. Urea (No. 1) completely decomposed in both tests and hydantoic acid (No. 4) decomposed and caused considerable foaming and discoloration of films in both tests.

EXAMPLE 4

The chemical preservatives of the invention (Nos. 5, 6, 7 and 8 in Table I) were compounded into two different fibrillatable, film-forming blends of resinous polymers at concentrations of 0.5, 1 and 2 weight % of the resin composition. Blend "A" contained 90 parts by weight of polypropylene (Profax 6423 marketed by Hercules, Inc.), 5 parts by weight polystyrene (Styron 685 marketed by Dow Chemical Co.) and 5 parts by weight titanium dioxide. Blend "B" contained 90 parts by weight of a high density polyethylene, 5 parts by weight of the same polystyrene, and 5 parts by weight clay (paper grade).

Separate samples of these blends containing one of the color preservatives of the invention and a control sample containing no color preservative were extruded into films having a thickness of approximately 0.004 inch. Each of the resultant film samples were stretched at room temperature and at a rate of 25 inches/minutes, resulting in a stretched tension of 4,000 p.s.i., until it was about 2 times its original length and had a thickness of about 0.0025 inch. The density of the stretched films were within the range of 0.65 to 0.70 g/cm$^3$, indicating a void volume of 30 to 35%.

Figure 1:
FIG. 1 is a photomicrograph, magnified 300 times, of the cross section of a meat interleaf prepared from a thermoplastic polymeric composition in accordance with a preferred embodiment of the invention, more particularly by the procedure described in Example 4.

FIGS. 1 and 2 are photomicrographs of a cross section of a representative sample of the stretched films. From these photomicrographs, it can be seen that the internal structure of the stretched film was highly fibrillated. Based on the dimensions of the fibrils, the internal surface area is estimated to be about 2 to 4 m$^2$/g of the film.

The stretched films were tested for effectiveness as a meat interleaf in the same manner as the paper interleafs in Example 2, except the meat samples were inspected for color change after 8 and 24 hours. The results from these tests are summarized in Table II attached.

EXAMPLE 5

Example 4 was repeated except the extruded films were tested for effectiveness as a meat interleaf without stretching and fibrillation. All of the meat samples lost their red color within 8 hours.

EXAMPLE 6

Films were extruded from the polymers identified in Example 3 using the same additives and amounts thereof described in Example 4 and stretched under the same conditions described in Example 4. The stretched films did not have the fibrillated structure obtained with the resin blends of Example 4 as illustrated in the photomicrographs of FIGS. 1 and 2. These films were tested for effectiveness as a meat interleaf in the same manner as the paper interleafs in Example 1. All of the meat samples lost their red color within 8 hours as in Example 5.

TABLE II

EFFECT OF COLOR PRESERVATIVES OF INVENTION INCORPORATED INTO FIBRILLATED POLYMERIC FILMS ON COLOR OF BEEF STEAKS

| Indent No.[1] | Color Preservative Amount in fibrillated film, wt. % | Meat Color[1] Resin Blend "A" After 8 hrs. | After 24 hrs. | Resin Blend "B" After 8 hrs. | After 24 hrs. |
|---|---|---|---|---|---|
| Control | none | b | b | b | b |
| 5 | 0.5 | b.r | b.r | b.r | b.r |
|  | 1 | b.r | b.r | b.r | b.r |
|  | 2 | b.r | b.r | b.r | b.r |
| 6 | 0.5 | b.r | s.b | b.r | s.b |
|  | 1 | b.r | s.b | b.r | s.b |
|  | 2 | b.r | b.r | b.r | b.r |
| 7 | 0.5 | s.b | b | s.b | b |
|  | 1 | b.r | b.r | b.r | b.r |
|  | 2 | b.r | b.r | b.r | b.r |
| 8 | 0.5 | r | s.b | r | s.b |
|  | 1 | b.r | b.r | b.r | b.r |
|  | 2 | b.r | b.r | b.r | b.r |

Notes:
[1]Color Code: b.r = bright red, s.b = slightly brown, r = red, b = brown
[2]See Table I From the foregoing examples, it can be seen that the color preservatives of the invention have sufficient heat stability to withstand the elevated temperatures normally used for extruding a film from a thermoplastic resinous polymeric composition. It can also be seen that even though the color preservatives of the invention are heat stable and are capable of preserving fresh red color of meat when otherwise applied to the meat (e.g., as an additive to a paper meat interleaf), an ordinary extruded polymeric film containing as much as 10 weight % of the color preservatives is not effective as a meat interleaf. On the other hand, polymeric films having an open-celled microporous structure and containing substantially smaller amounts of the color preservatives are capable of preserving the red color of fresh meat for up to 24 hours or more when used as a meat interleaf. Further, from the control sample in Example 4, it can be seen that a fibrillated polymeric film which does not contain a color preservative of the invention is not particularly effective as a meat interleaf because the meat turns brown within 8 hours.

From the foregoing description, one skilled in the art can easily ascertain the essential characteristics of the invention and, without departing from the spirit and scope thereof, can make various changes and modifications of the invention to adapt it to various usages and conditions.

I claim:

1. A process for treating fresh red meat to preserve the red color of the meat comprising the step of introducing into the meat a meat color preservative selected from the group consisting of sodium cyanate, acetylurea, sodium-5-acetylhydantoate, urethylane sodium carboxylate, and mixtures thereof, in an amount sufficient to stabilize the red color of the meat.

2. A process according to claim 1 wherein the amount of said color preservative introduced into the meat is within the range of about 0.02 to about 0.5 g per 1 square foot surface of the meat.

3. A process according to claim 2 wherein said compound is applied as an aqueous solution to the surface of the meat.

4. A process according to claim 2 wherein the amount of said color preservative is within the range of about 0.05 to about 0.2 g per 1 square foot surface of the meat.

5. A process according to claim 1 wherein
said color preservative is incorporated into a sheet of material selected from the group consisting of an open-celled, microporous, thermoplastic, polymeric film having an internal surface area of at least 0.5 m$^2$/g and a porous meat interleaf paper in an amount within the range of about 0.25 to about 10 weight %, based on the weight of said material, and said sheet is placed in direct contact with the surface of the meat.

6. A process according to claim 5 wherein said material is an open-celled, microporous, thermoplastic, polymeric film having an internal surface area within the range of about 2 to about 10 m$^2$/g.

7. A process according to claim 6 wherein the amount of said color preservative incorporated into said polymeric film is within the range of about 0.5 to about 3 weight %.

8. A process according to claim 7 wherein said film is formed by extrusion and fibrillated after extrusion.

9. A sheet of material selected from the group consisting of an open-celled, microporous, thermoplastic, polymeric film having an internal surface area of at least 0.5 m$^2$/g and a porous meat interleaf paper containing from about 0.25 to about 10 weight % of a meat color preservative selected from the group consisting of sodium cyanate, acetylurea, sodium-5-acetylhydantoate, urethylane sodium carboxylate, and mixtures thereof.

10. A sheet according to claim 9 wherein said material is an open-celled, microporous, thermoplastic, polymeric film having a surface area within the range of about 2 to about 10 m$^2$/g.

11. A sheet according to claim 9 wherein said material is an extruded thermoplastic, fibrillatable, polymeric film which, after extrusion, has been fibrillated to form an open-celled structure wherein from about 5 to about 70% of the total volume is voids.

12. A sheet according to claim 11 wherein the voids are about 20 to about 40% of the total volume.

13. A sheet according to claim 11 wherein the thermoplastic polymeric composition from which said film is extruded comprises about 50 to about 90 parts by weight polypropylene, polyethylene, or mixtures thereof, about 5 to about 50 parts by weight polystyrene, and about 1 to about 20 parts by weight of an inorganic filler.

14. A method for making a meat interleaf material comprising the steps of
admixing a fibrillatable, film-forming resinous polymeric composition and a meat color preservative selected from the group consisting of sodium cyanate, acetylurea, sodium-5-acetylhydantoate, urethylane sodium carboxylate, and mixtures thereof, the amount of said color preservative being within the range of about 0.25 to about 10 weight %, based on the weight of said polymeric composition;
extruding the resultant admixture into a thin film; and
fibrillating the extruded film to form an open-celled, microporous structure wherein from about 5 to about 70% of the total volume is voids.

15. A method according to claim 14 wherein the amount of said color preservative is within the range of about 0.5 to about 3, based on the total weight of said polymeric composition.

16. A method according to claim 15 wherein the voids in said material is from about 20 to about 40% of the total volume.

17. A method according to claim 14 wherein said polymeric composition comprises about 50 to about 90 parts by weight polypropylene, polyethylene or mixtures thereof, about 5 to about 50 parts by weight of polystyrene and about 1 to about 20 parts by weight of an inorganic filler.

* * * * *